(12) United States Patent
Poulsen et al.

(10) Patent No.: US 8,769,490 B2
(45) Date of Patent: Jul. 1, 2014

(54) DESKTOP WIDGET ENGINE EMULATOR COMPONENT FOR A RAPID APPLICATION DEVELOPMENT TOOL

(75) Inventors: Thomas Poulsen, Los Gatos, CA (US); Terence Munday, Menlo Park, CA (US); Trevor Mathers, Portland, OR (US); Manohar Golla, Vittal Nagar Godavarikhani (IN)

(73) Assignee: Oracle International Corporation, Redwood Shores, CA (US)

( * ) Notice: Subject to any disclaimer, the term of this patent is extended or adjusted under 35 U.S.C. 154(b) by 1133 days.

(21) Appl. No.: 12/211,795

(22) Filed: Sep. 16, 2008

(65) Prior Publication Data

US 2010/0070968 A1    Mar. 18, 2010

(51) Int. Cl.
    *G06F 9/44*    (2006.01)
(52) U.S. Cl.
    USPC ............................ 717/114; 717/120; 717/174
(58) Field of Classification Search
    USPC .......................................... 717/114, 120, 174
    See application file for complete search history.

(56) References Cited

U.S. PATENT DOCUMENTS

| | | |
|---|---|---|
| 7,546,543 B2 | 6/2009 | Louch et al. |
| 7,707,514 B2 | 4/2010 | Forstall et al. |
| 7,743,336 B2 | 6/2010 | Louch et al. |
| 7,917,858 B2 | 3/2011 | Pereira et al. |
| 8,015,491 B2 | 9/2011 | Shaver et al. |
| 8,056,092 B2 | 11/2011 | Allen et al. |
| 8,150,939 B1 | 4/2012 | Murray |
| 8,166,071 B1 | 4/2012 | Korablev et al. |
| 2001/0052108 A1 | 12/2001 | Bowman-Amuah |
| 2002/0049603 A1 | 4/2002 | Mehra et al. |
| 2002/0120859 A1 | 8/2002 | Lipkin et al. |
| 2002/0138719 A1 | 9/2002 | Farkas et al. |
| 2003/0051136 A1 | 3/2003 | Curtis et al. |
| 2003/0061482 A1 | 3/2003 | Emmerichs |
| 2003/0222918 A1 | 12/2003 | Coulhard |
| 2004/0046789 A1 | 3/2004 | Inanoria |
| 2004/0059587 A1 | 3/2004 | Astle et al. |
| 2004/0111428 A1 | 6/2004 | Rajan et al. |
| 2005/0010880 A1 | 1/2005 | Schubert et al. |

(Continued)

OTHER PUBLICATIONS

U.S. Appl. No. 12/211,784, Final Office Action mailed on Sep. 20, 2011, 17 pages.

(Continued)

*Primary Examiner* — Li B Zhen
*Assistant Examiner* — Duy Khuong Nguyen
(74) *Attorney, Agent, or Firm* — Kilpatrick Townsend & Stockton, LLP

(57) ABSTRACT

An emulator for hosting desktop widgets. The emulator mimics the functions of a desktop widget engine. The emulator serves as a user interface component that may be added via a rapid application development tool, such as Oracle International Corporation's Application Development Framework. The rapid application development tool may be used to install the emulator, for example, in a region of a user interaction environment or an application created by the rapid application development tool. If desired, multiple options may be provided in terms of regions to provide the emulator. In addition, one or more selection devices, such as a drop down menu, may be provided to select particular desktop widgets for use and display. Tabbed pages may be provided on a display for the emulator for organizing both personal and enterprise desktop widgets. Security settings control access to widgets, and an option to allow or restrict access to widget display options in the emulator.

19 Claims, 5 Drawing Sheets

(56) References Cited

U.S. PATENT DOCUMENTS

| | | |
|---|---|---|
| 2005/0044423 A1 | 2/2005 | Mellmer et al. |
| 2005/0177837 A1 | 8/2005 | Mensah et al. |
| 2005/0193368 A1 | 9/2005 | Becker et al. |
| 2006/0048225 A1 | 3/2006 | Gomez et al. |
| 2006/0168536 A1 | 7/2006 | Portmann |
| 2006/0277481 A1 | 12/2006 | Forstall et al. |
| 2007/0079383 A1 | 4/2007 | Gopalakrishnan |
| 2007/0083378 A1 | 4/2007 | Guarraci et al. |
| 2007/0101146 A1 | 5/2007 | Louch et al. |
| 2007/0101433 A1 | 5/2007 | Louch et al. |
| 2007/0288858 A1 | 12/2007 | Pereira et al. |
| 2008/0034309 A1 | 2/2008 | Louch et al. |
| 2008/0040426 A1* | 2/2008 | Synstelien et al. ............ 709/203 |
| 2008/0052348 A1 | 2/2008 | Adler et al. |
| 2008/0091952 A1 | 4/2008 | Sumner et al. |
| 2008/0141141 A1 | 6/2008 | Moore et al. |
| 2008/0141153 A1 | 6/2008 | Samson et al. |
| 2008/0141341 A1 | 6/2008 | Vinogradov et al. |
| 2008/0148283 A1 | 6/2008 | Allen et al. |
| 2008/0195483 A1 | 8/2008 | Moore |
| 2008/0215879 A1 | 9/2008 | Williams et al. |
| 2008/0215998 A1* | 9/2008 | Moore et al. ................... 715/762 |
| 2008/0222232 A1 | 9/2008 | Allen et al. |
| 2008/0222658 A1 | 9/2008 | Allen et al. |
| 2008/0244293 A1 | 10/2008 | Morris |
| 2008/0255962 A1 | 10/2008 | Chang et al. |
| 2008/0271127 A1* | 10/2008 | Naibo et al. ...................... 726/6 |
| 2008/0301460 A1 | 12/2008 | Miller et al. |
| 2008/0307385 A1 | 12/2008 | Dreiling et al. |
| 2008/0320446 A1* | 12/2008 | Redpath ........................ 717/118 |
| 2009/0013310 A1 | 1/2009 | Arner et al. |
| 2009/0044138 A1 | 2/2009 | Rudolph et al. |
| 2009/0070692 A1 | 3/2009 | Dawes et al. |
| 2009/0077623 A1 | 3/2009 | Baum et al. |
| 2009/0077624 A1 | 3/2009 | Baum et al. |
| 2009/0172021 A1 | 7/2009 | Kane et al. |
| 2009/0228838 A1 | 9/2009 | Ryan et al. |
| 2009/0235149 A1 | 9/2009 | Frohwein |
| 2009/0247134 A1 | 10/2009 | Jeide et al. |
| 2009/0249282 A1 | 10/2009 | Meijer et al. |
| 2009/0254745 A1 | 10/2009 | Ganesan |
| 2009/0307609 A1 | 12/2009 | Ganz et al. |
| 2009/0313601 A1 | 12/2009 | Baird et al. |
| 2009/0320105 A1 | 12/2009 | Jurkiewicz et al. |
| 2010/0070886 A1 | 3/2010 | Poulsen et al. |
| 2010/0071026 A1 | 3/2010 | Poulsen et al. |
| 2010/0114739 A1 | 5/2010 | Johnston |
| 2010/0299598 A1 | 11/2010 | Shin et al. |
| 2010/0305999 A1 | 12/2010 | Fujioka |

OTHER PUBLICATIONS

U.S. Appl. No. 12/211,784, Non-Final Office Action mailed Mar. 31, 2011, 12 pages.
U.S. Appl. No. 12/211,784, Non-Final Office Action mailed on Jun. 6, 2013, 16 pages.
U.S. Appl. No. 12/211,784, Notice of Allowance mailed on Nov. 25, 2013, 16 pages.
U.S. Appl. No. 12/211,784, Office Action mailed on Apr. 5, 2012, 14 pages.
U.S. Appl. No. 12/211,784, Office Action mailed on Nov. 6, 2012, 16 pages.
U.S. Appl. No. 12/211,801, Final Office Action mailed on Apr. 13, 2011, 14 pages.
U.S. Appl. No. 12/211,801, Non-Final Office Action mailed on Dec. 21, 2010, 10 pages.
U.S. Appl. No. 12/211,801, Non-Final Office Action mailed on Aug. 24, 2011, 15 pages.
U.S. Appl. No. 12/211,801, Non-Final Office Action mailed on Sep. 26, 2013, 16 pages.
U.S. Appl. No. 12/211,801, Office Action mailed on Mar. 8, 2012, 16 pages.
U.S. Appl. No. 12/211,784, "Notice of Allowance", Jan. 7, 2014, 9 pages.

* cited by examiner

DESKTOP WIDGET ENGINE EMULATOR COMPONENT FOR A RAPID APPLICATION DEVELOPMENT TOOL

BACKGROUND OF THE INVENTION

A desktop widget is a small specialized graphical user interface (GUI) application that provides some visual information and/or easy access to frequently used functions such as clocks, calendars, news aggregators, calculators and desktop notes. A widget engine is a software service available to users for running and displaying desktop widgets on the desktop of a computer. Desktop widgets are different than web widgets. Web widgets run inside a web page and are also known as "modules" or "badges." Web widgets allow anyone to create a website by embedding content or tools from one site onto a page of another site. In contrast, a desktop widget is a desktop-based mini-application that shows discrete information, often connected to the Internet.

One of the most popular desktop widgets is YAHOO! Widgets. YAHOO! Widgets provide an XML/JavaScript solution to building simple components for a person's desktop. These components, however, like all desktop widgets, have to be rendered by a widget engine installed on a user's desktop. Once the widget engine has been installed, a user may install any desktop widget. This feature may result in clutter of a work computer's desktop with applications that are for personal use rather than specific to the business.

From an enterprise perspective, there is no way to administrate desktop widgets as most desktop widgets, including YAHOO! Widgets, require a manual download to the desktop of the widget engine, and once a user has installed this application, they can download any number of widgets they choose, including widgets that may contribute to an employee's efficiency, but also many widgets that are of a personal nature and which may reduce efficiency. Businesses that wish to develop or promote widgets that are useful to their employees or clients have to contend with the possibility that employees will take advantage of the presence of the desktop widget engine on their desktop to download non-business essential desktop widgets.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

In accordance with an embodiment, an emulator is provided for hosting desktop widgets. The emulator mimics the functions of a desktop widget engine. The emulator serves as a component that may be added via a rapid application development tool, such as Oracle International Corporation's Application Development Framework. The rapid application development tool may be used to install the emulator, for example, in a region of a user interaction environment, such as an application or a suite of user interactive applications, created by the rapid application development tool. If desired, multiple options may be provided in terms of regions to provide the emulator. In addition, one or more selection devices, such as a drop down menu, may be provided to select particular desktop widgets for use and display. Tabbed pages may be provided on a display for the emulator for organizing both personal and enterprise desktop widgets.

In accordance with an embodiment, an administrator may seed the emulator with a specific widget or widgets, and, if the administrator so chooses, may provide customization and preference options to users to manage their own desktop widgets. Different users may be presented with different sets of desktop widgets based upon their security clearance and/or profiles.

In an embodiment, the emulator includes a parser, such as an XML interpreter, for interpreting a desktop widget configuration file. The emulator may also include a library containing code, such as JavaScript code, that performs actions requested by the interpreted desktop widget configuration file. Alternatively, the library may map calls to code typically found in the desktop widget engine to code locally stored with the user interaction environment.

If desired, toolbar controls may be provided for adding, hiding, or removing desktop widgets from the display region of the desktop widget engine emulator.

Other features of the invention will become apparent from the following detailed description when taken in conjunction with the drawings, in which:

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
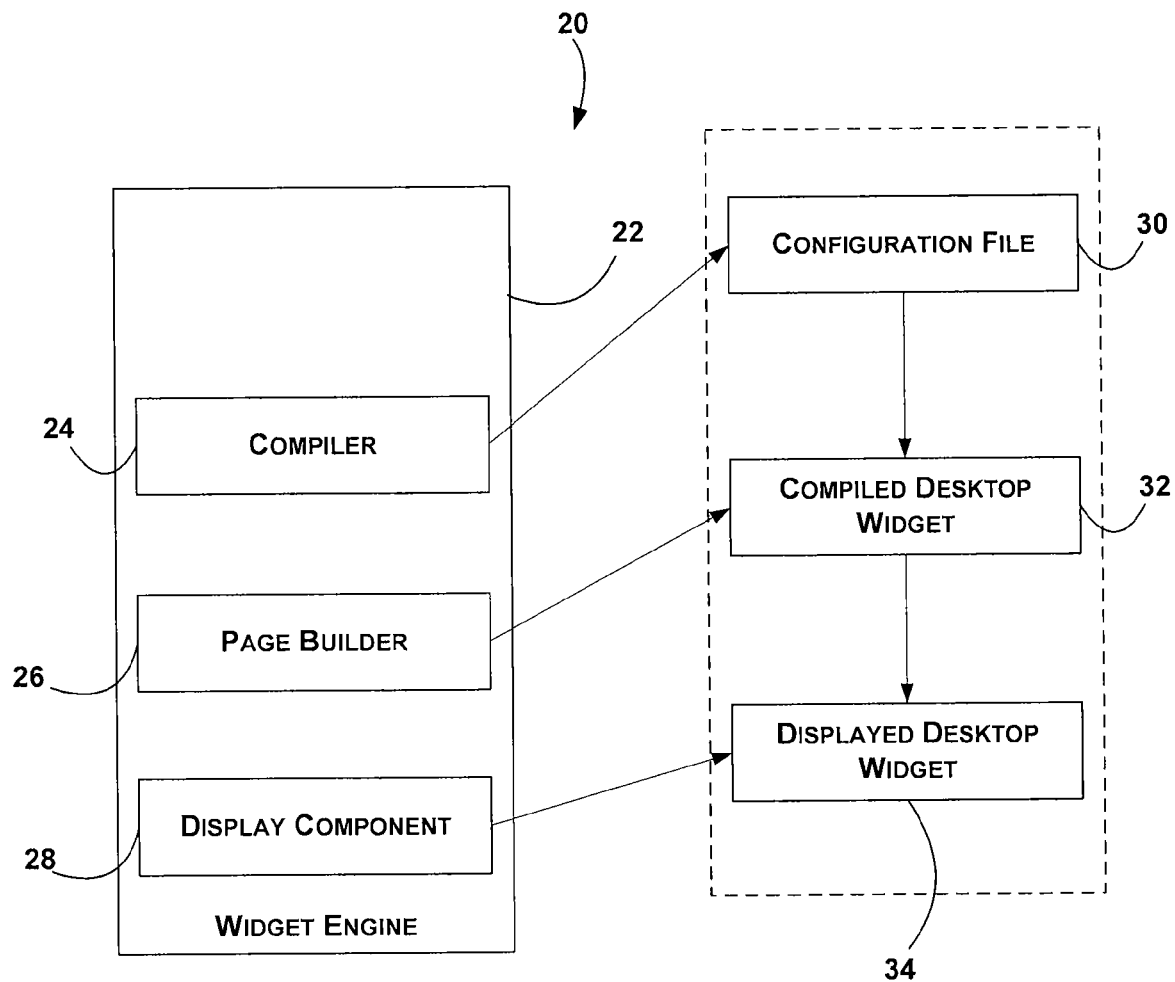
FIG. 1 is a block diagram representing a prior art YAHOO! Widget.

Referring now to the drawings, in which like reference numerals represent like parts throughout the several views, FIG. 1 shows a prior art desktop widget environment 20. The desktop widget environment 20 represents, for example, a YAHOO! Widget environment. Although some desktop widget container environments may be different than shown, the basic components shown in FIG. 1 are believed to be present in most prior art desktop widget environments.

The desktop widget environment 20 includes a widget engine 22. For YAHOO! Widgets, the widget engine 22 is called KONFABULATOR. The widget engine 22 includes a compiler 24 and a page builder 26. The widget engine 22 also includes a display component 28.

For each desktop widget, a configuration file 30 is provided. This configuration file includes configuration information such as controls a desktop widget will have (size, etc.). The configuration file may also specify actions the controls will take and events that a control may return. The configuration file may include native JavaScript to make calls to the Internet to retrieve web pages, RSS, or interact with online scripts. Calls may be JavaScript, with related code maintained by the widget engine. Configuration files are well known in the art, and for YAHOO! Widgets, are called "KON" files.

In use, the widget engine 22, and more specifically the compiler 24, configures the configuration file 30 into a compiled widget 32. This compiled widget 32, in turn, is built into a page by the page builder 26 and is displayed by the display component 28 as a displayed desktop widget 34. KONFABULATOR, for example, utilizes a JavaScript runtime environment combined with an XML interpreter. One or more widgets may be displayed by the display component 28. Each desktop widget typically runs its own system process, separate from other desktop widgets.

As described in the background section of this document, one problem with the desktop widget environment 20 shown in FIG. 1 is that, once the widget engine 22 is installed on a user's desktop, an administrator cannot administrate what desktop widgets are downloaded and utilized by each of the users on a network. Desktop widgets may contribute to an employee's efficiency, but many widgets may do just the opposite: they may distract an employee from work tasks.

Figure 2:
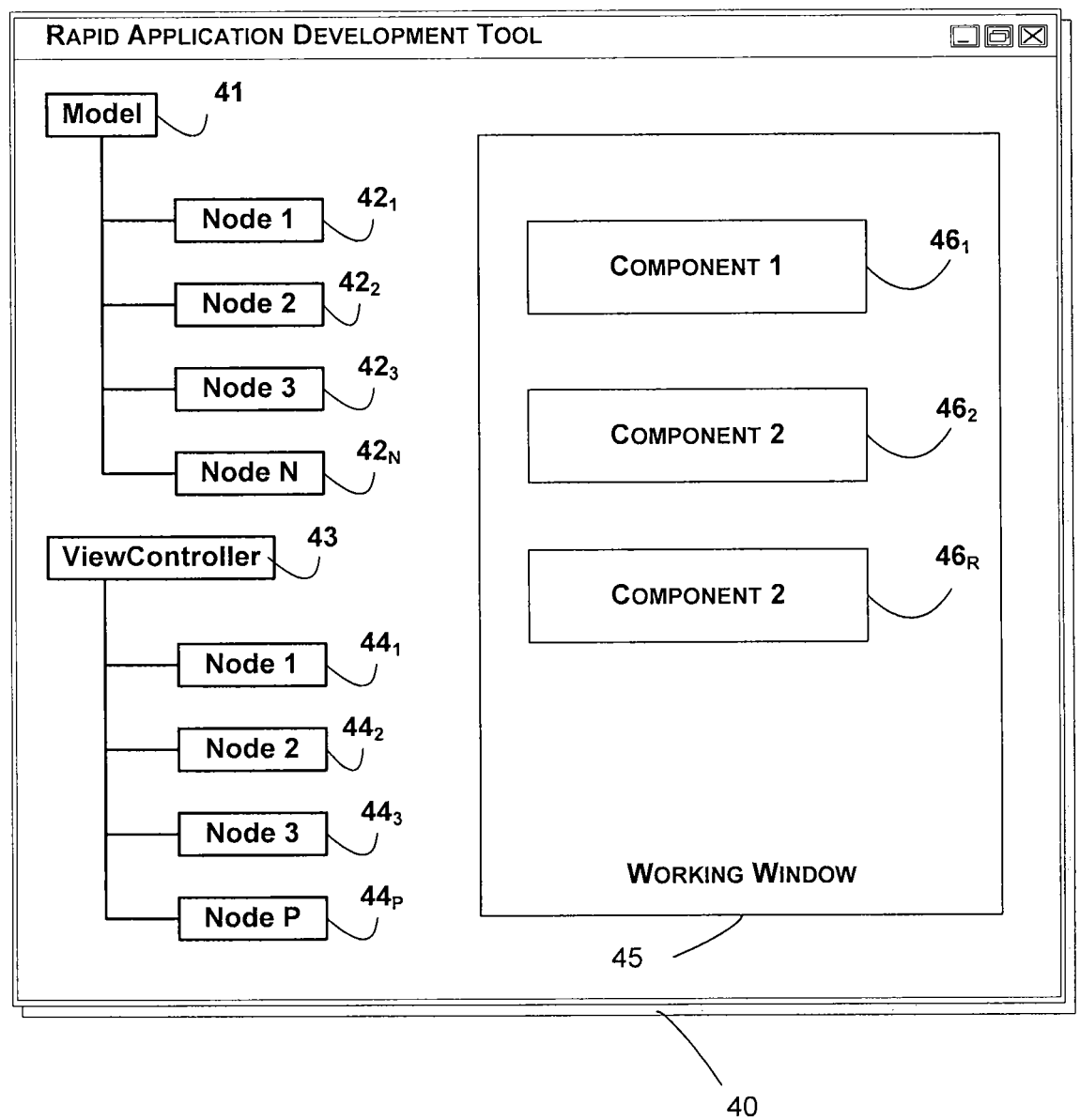
FIG. 2 is a block diagram representing components of a rapid application development tool in accordance with an embodiment.

In accordance with an embodiment, an emulator is provided that mimics the functions of a widget engine, such as the prior art widget engine 22 described above. The emulator may be utilized, for example, in a graphical user interface component of a rapid application development tool. Rapid application development tools, such as a rapid application development tool 40 shown in FIG. 2, are known. In general, rapid application development tools utilize web application frameworks or other types of software frameworks to speed application development. Prototypes or templates are provided as easily-added building blocks for user interface modules and other components of an application or another user interaction environment.

An example of a rapid application development tool is Oracle International Corporation's Application Development Framework, also called the "ORACLE ADF." ORACLE ADF is a commercial Java framework for creating enterprise applications and user interaction environments.

ORACLE ADF is based upon the model-view-controller architecture, which is well known and documented. This architecture isolates business logic (e.g., data) from user interface considerations, resulting in an application or user interaction environment where it is easier to modify either the visual appearance of the application or another user interaction environment or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements.

The rapid application development tool 40 shown in FIG. 2 is a simplified representation of the user interface for ORACLE ADF. The rapid application development tool 40 includes a model tree 41 having nodes 42 representing data for use in creating a user interaction environment, such as a user interaction environment 50 (FIG. 3) The user interaction environment 50 may be, for example, an application or a suite of user interactive interfaces.

The rapid application development tool 40 also includes a view controller tree 43, which includes both the view and controller features of the model-view-controller architecture. Again, like the model tree 41, the view controller tree 43 includes nodes 44 that may be utilized for creating a user interaction environment 50.

The developer utilizes tools provided by the rapid application development tool 40 to create components 46 utilizing the model tree nodes 42 and the view controller nodes 44. The model tree nodes 42 and the view controller nodes 44 are bound during this process. Nodes 42, 44 may be selected for use via a wizard or other tool, or may be implemented using drag and drop or other methods. Each component may include several different options for display or function.

The components 46 may be utilized in development of an application or another user interaction environment 50. The user interaction environment 50 and/or the components 46 are typically created within the working window 45. The components 46 may be added, for example, via a wizard, using drag and drop methods, or utilizing other methods. During development of the components 46, a developer may utilize a design view, in which components 46 are viewable as user interface modules, or a source view in which the source code for the components is viewable and editable.

Although ORACLE ADF is provided as an example, the widget host container component described herein may be utilized in other rapid application development tool environments. However, for ease of description, the example herein involves use of ORACLE ADF.

One of the components, for example the component $46_1$, of ORACLE ADF is a task flow component. A task flow is a ORACLE ADF component in which a developer defines an application task. The definition of the task includes the pages and logic that interact to allow the task flow to complete the task. At design time, the pages and page fragments that make up a task are added to a task flow as activities; in the cases of pages and page fragments they are view activities. So, when users navigate from one page to another within a task flow, they are transitioning from one activity to another. Activities can be considered the building blocks of the task flows. There are other activities besides view activities. ORACLE ADF task flows are well known and documented, so their structures are not described in detail here.

Figure 3:
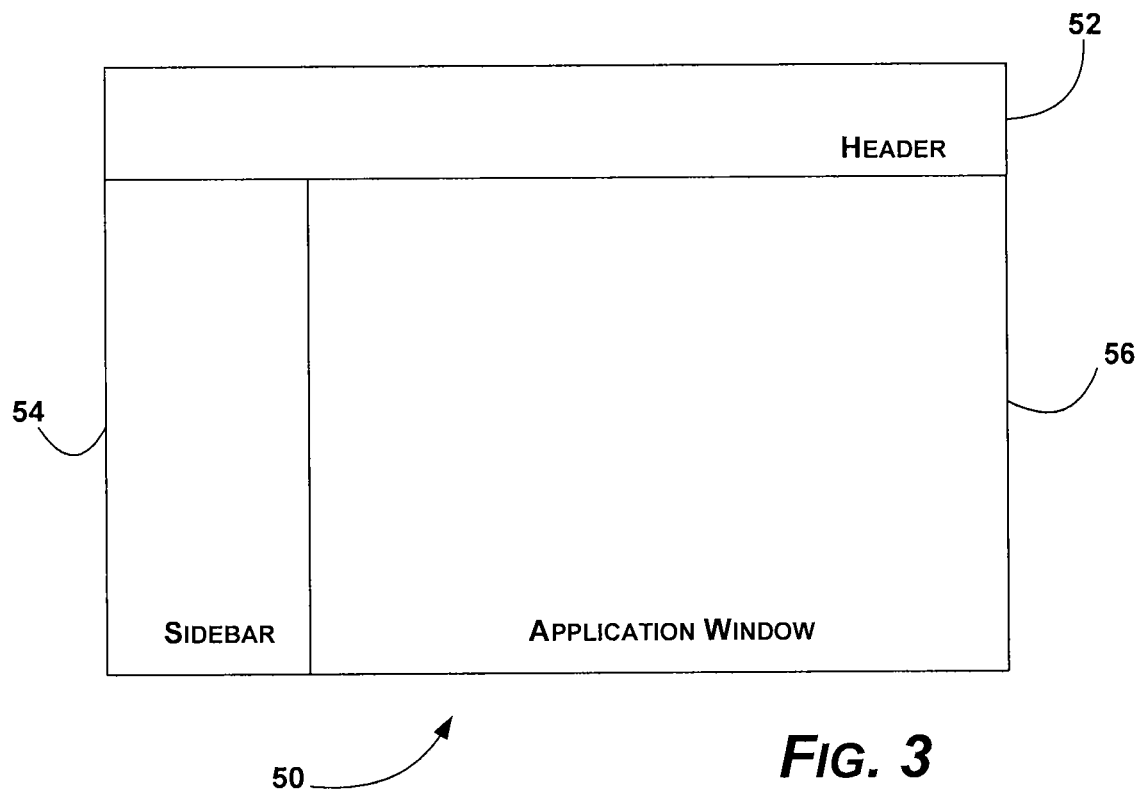
FIG. 3 is a representation of a user interaction environment created by the rapid application development tool of FIG. 2 in accordance with an embodiment.

FIG. 3 shows an example of a user interaction environment 50 developed by the rapid application development tool 40. The user interaction environment 50 in the example shown in the figure includes a header 52, a sidebar 54, and an application window 56. Each of these regions of the user interaction environment 50 may be formed by the rapid application development tool 40. The user interaction environment 50 is a suite of interactive applications, and serves as the screen view provided to each of the users on a network. The application window 56 hosts a current application used by a user. The sidebar 54 may include a collection of the components 46, and the header 52 may include a collection of components and/or links. The application window 56 may include one or more of the components 46. The user interaction environment 50 is but one example of a layout of a user interaction environment that may be provided by the rapid application development tool 40.

In embodiments, a desktop widget engine emulator may be utilized in any of the regions of the user interaction environment 50, including the header 52 and the sidebar 54, or specific regions within each of these areas. For example, for an embodiment where a task flow is utilized, the task flow may be placed in an upper portion of the sidebar 54 of the user interaction environment 50.

Figure 4:
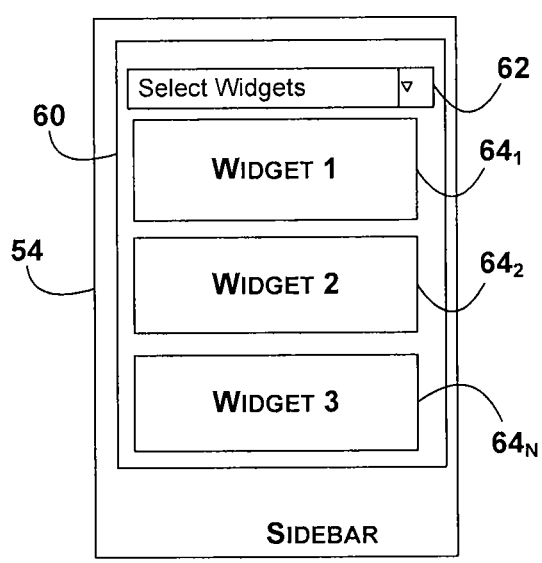
FIG. 4 is a block representation of an emulator for displaying one or more desktop widgets in accordance with an embodiment.

In accordance with an embodiment, as shown in FIG. 4, the sidebar 54 includes a desktop widget emulator component 60 having a drop-down menu 62 and several desktop widgets 64 displayed. The drop-down menu 62 permits a user to select one or more desktop widgets 64 for display.

The emulator component 60 may be one of the components of the rapid application development tool 40 shown in FIG. 2, for example, the component 46. In an embodiment, the web widget component 60 is formed from a task flow, such as is described above.

Figure 5:
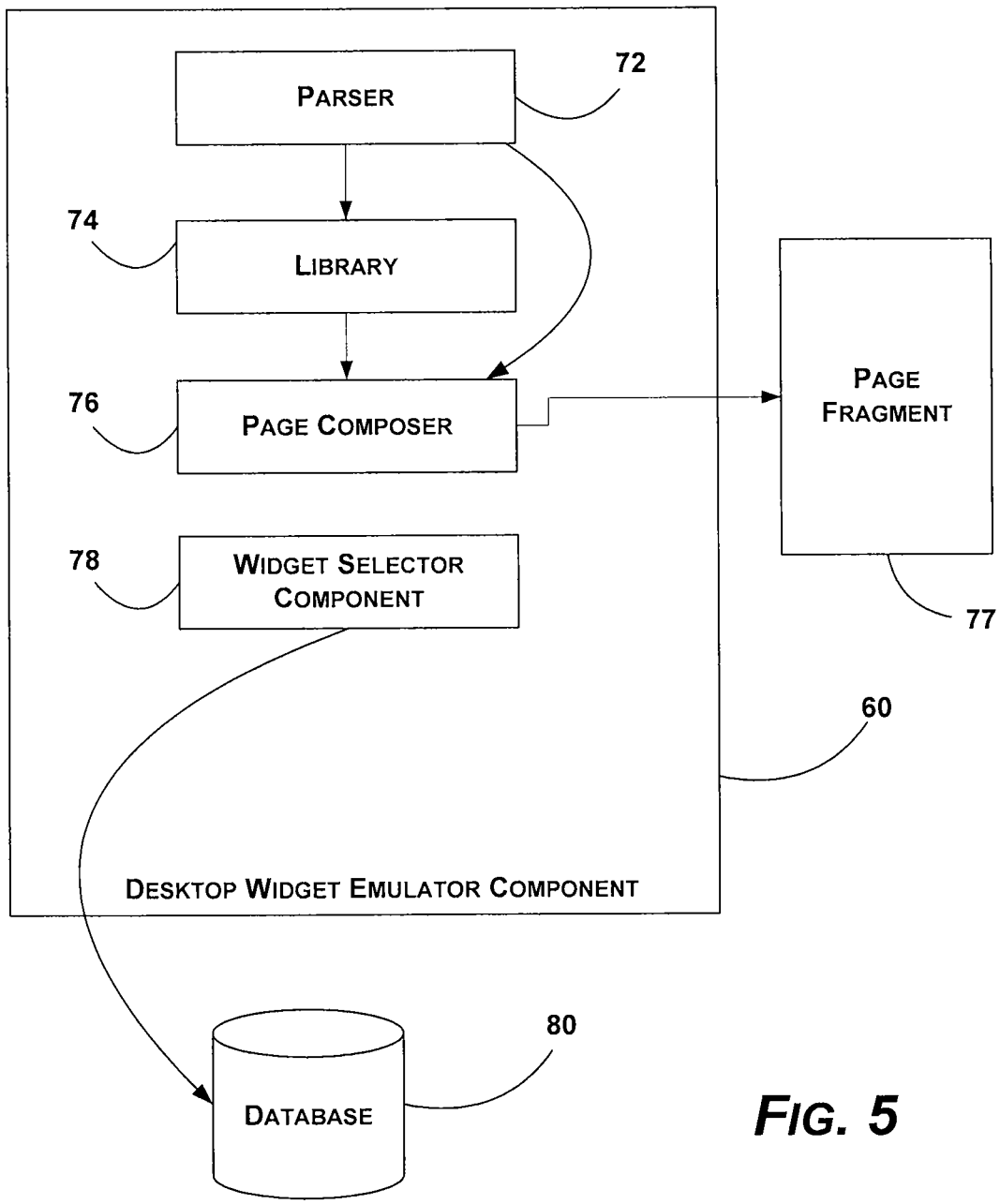
FIG. 5 is a block diagram representing components of the emulator of FIG. 4 in accordance with an embodiment.

In use, the desktop widget engine emulator component 60 is created by a component designer for the rapid application development tool 40. In the example shown in FIG. 5, the emulator component 60 includes a parser 72, a library 74, and a page composer 76. The parser 72, the library 74, and the page composer 76 act to generate a page that is ready for display in the emulator component 60. As described below, the parser 72, the library 74, and the page composer 76 are designed to mimic the functions of the compiler 24, the page builder 26, and the display component 28 of prior art widget engines, such as the widget engine 22.

The component designer associates the desktop widget engine emulator component 60 with one or more conventional desktop widgets. To this end, a database 80 may be provided for storing the desktop widgets. This database 80 may be maintained, for example, on a server that is associated with the user interaction environment 50.

Figure 6:
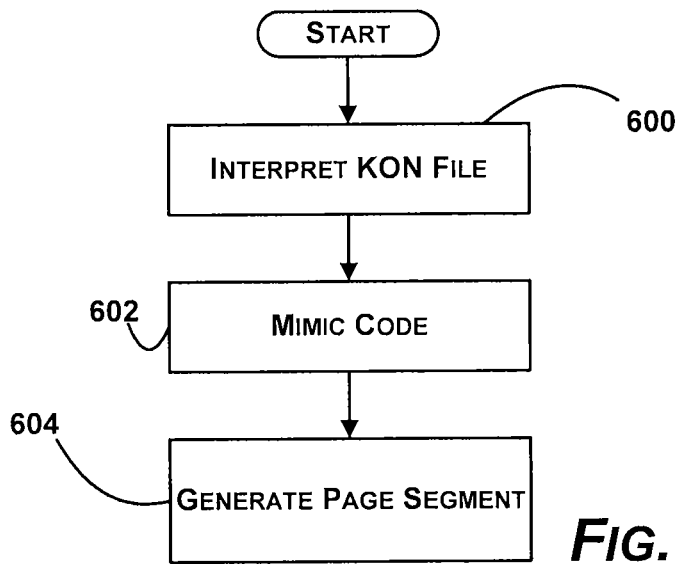
FIG. 6 is a flow diagram representing steps for generating a desktop widget page in accordance with an embodiment.

The parser 72, the library 74, and the page composer 76 are used to generate a page fragment 77 for display within the desktop widget emulator component 60. FIG. 6 is a flow diagram representing steps for generating a desktop widget page in accordance with an embodiment. Beginning at step 600, a configuration file (e.g., a KON file) is parsed, for example by the parser 72. The parser 72, which may be, for example, an XML interpreter, interprets the tags within the configuration files 30 of a selected widget's configuration file 30. The tags may include information (e.g., HTML) for the page composer 76 to build a page fragment 77 in the display component.

At step 602, the desktop widget engine emulator component 60 mimics code utilized by conventional desktop engines. As part of the interpretation of the configuration file 30, calls to code, such as JavaScript code, may be parsed. To this end, the library 72 may include duplicates to code, such as JavaScript, that are capable of performing the functions of the code contained within the prior art widget engine 22. The library 72 may include code developed utilizing known information regarding JavaScript and other code in existing desktop widget engines, such as YAHOO! Widgets widget engines. Such information is publicly available. As another option, the library 74 may include mapping of the calls to code stored somewhere remote from the library 74, for example in the database 80. This code may be maintained with the desktop widget engine emulator component 60 or may be stored on a server, for example.

At step 604, a page fragment 77 is built for the widget, for example by the page composer 76. The parser 72 and the library 74 may, for example, develop a page fragment 77 formed in accordance with an object model, such as the Document Object Model. This page fragment 77 may be accessed to be displayed by the desktop widget emulator component 60. To this end, the desktop widget emulator component 60 preferably is capable of rendering the display language for the compiled widget, which may be, for example, HTML.

If configuration files 30 are stored in the database 80, then the parser 72, the library 74, and the page composer 76 may be included in the desktop widget engine emulator component 60, and desktop widget page fragments 77 may be built locally. Alternatively, built pages may be stored in the database 80, and the parser 72, the library 74, and the page composer 76 may be used to generate the page fragments 77, but are not necessarily used locally. The stored page fragments 77 may be associated with the user interaction environment 50, for example stored in the database 80. Ultimately, once a page fragment 77 is built and instantiated locally in the emulator component 60, then the configuration file 30, the parser 72, the library 74, and the page composer 76 should not be needed again for that widget.

The desktop widget engine emulator component 60 includes a selector component 78. As part of the features of the emulator component 60, a component designer may limit widgets that are available for use with the emulator component 60. In addition, a developer (i.e., a person utilizing the rapid application development tool 40 to build the user interaction environment 50) may limit the widgets available to one or more of the ultimate users of the user interaction environment 50. These limitations may be set, for example, via the selector component 78, by widgets or widget pages that are actually available at the database 80, and/or by security or privileges set by the developer or an administrator of the user interaction environment 50.

Figure 7:
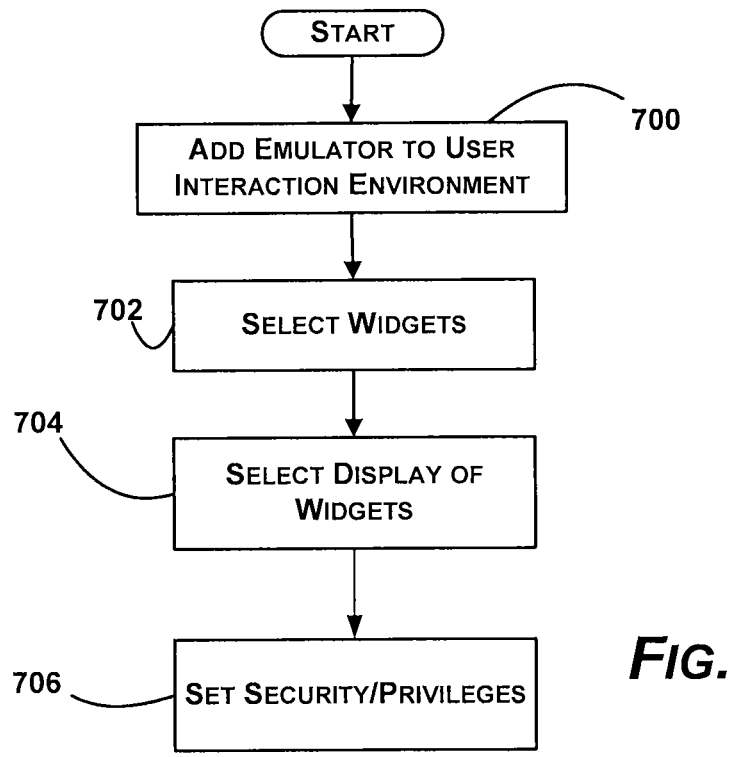
FIG. 7 is a flow chart representing steps for building an application or user interaction environment with the desktop widget engine emulator of FIG. 4 in accordance with an embodiment.

FIG. 7 is a flow chart representing steps for building an application or user interaction environment including the desktop widget engine emulator component 60 in accordance with an embodiment. In step 700, a developer adds the desktop widget engine emulator component 60 to the user interaction environment 50, for example by dragging and dropping a task flow including the desktop widget engine emulator component 60 into a region of the side bar 54. At step 702, the developer may select one or more widgets that may be used with the desktop widget engine emulator component 60. These widgets are available, for example, via the Internet, or may be provided by the designer of the desktop widget engine emulator component 60. At step 704, the developer may select how to display the selected widgets, for example via the widget selector component 78. As examples, a developer may select to require display of all of these widgets in the desktop widget emulator component 60, or may allow selection of particular desktop widgets via the drop-down menu 62. Page fragments 77 for each of the selected desktop widgets are displayed in the desktop widget emulator component 60. At step 706, if desired, security and/or privileges may be applied to the desktop widget engine emulator 60 so that different users may have different selections of widgets available. Alternatively, the developer may provide or turn on a feature for an administrator of the user interaction environment 50 to set security and or privileges for desktop widgets.

During use, the selected widgets 64 are displayed by the desktop widget engine emulator component 60 at the desktop emulator component 60. The page segments 77 are accessed and displayed in the emulator component 60. If desired, tabs or other features may be provided for organizing the widgets.

The desktop widget engine emulator component 60 provides an enterprise solution for making desktop widgets, such as YAHOO! Widgets, available on user's computers throughout a network. The desktop widget engine emulator component 60 allows use of desktop widgets in an enterprise environment. A developer or administrator may limit particular desktop widgets based upon security and/or privileges. The developer may choose to display the desktop widgets in multiple different regions of the user interaction environment 50. A user may select one or more of the desktop widgets for use via a drop-down menu or other selection device provided by the developer. The desktop widgets may interact with data available to the user interaction environment 50. This data may be, for example, business data available on a network.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer system, comprising:
   one or more processors; and
   memory including executable instructions that, when executed collectively by the one or more processors, cause the computer system to implement at least:
   a desktop widget engine emulator managed by a developer that receives a desktop widget configuration file and emulates the behavior of a widget engine to display desktop widgets in an enterprise environment to a user, the desktop widget emulator including a widget selector component configured to enable the developer to identify available widgets for use within the enterprise environment, the desktop widget emulator comprising:
      a first component configured to parse the desktop widget configuration file, the desktop widget configuration file configured to be run on the widget engine;
      a second component configured to emulate program code utilized when the desktop widget configuration file is run by the widget engine; and
      a third component configured to compose a page from the desktop widget configuration file utilizing the actions of the first and second components.

2. The computer system of claim 1, wherein the first component comprises an XML parser.

3. The computer system of claim 1, wherein the second component comprises a JavaScript library.

4. The computer system of claim 1, wherein the second component comprises a library that maps calls to code stored on a local network.

5. The computer system of claim 1, wherein the desktop widget configuration file is configured to run on a commercially available third-party widget engine.

6. The computer system of claim 1, wherein the desktop widget engine emulator further comprises a user interface for displaying the page.

7. The computer system of claim 6, wherein the user interface comprises a user selection device for selecting desktop widgets to be displayed.

8. The computer system of claim 1, wherein the widget selector component is further configured for selecting, by the user, the available widgets identified by the developer.

9. The computer system of claim 8, wherein the widget selector component comprises a feature to permit the identification, by the developer, of widget availability based upon at least one of security or privilege settings.

10. A computer system, comprising:
    one or more processors; and
    memory including executable instructions that, when executed collectively by the one or more processors, cause the computer system to implement at least:
    a user interface container for a rapid application development tool, the user interface container comprising:
       a desktop widget engine emulator managed by a developer for receiving a desktop widget configuration file and emulating the behavior of a widget engine to display a desktop widget in an enterprise environment to a user, the desktop widget emulator including a widget selector component configured to enable the developer to identify available widgets for use within the enterprise environment;
       a first component configured to parse the desktop widget configuration file, the desktop widget configuration file configured to be run on the widget engine;
       a second component configured to emulate program code utilized when the desktop widget configuration file is run by the widget engine; and
       a third component configured to compose a page from the desktop widget configuration file utilizing the actions of the first and second components.

11. The computer system of claim 10, further comprising a user interface for displaying the page.

12. The computer system of claim 11, wherein the user interface comprises a user selection device for selecting desktop widgets to be displayed.

13. The computer system of claim 10, wherein the widget selector component is further configured for selecting, by the user, the available widgets identified by the developer.

14. The computer system of claim 13, wherein the widget selector component comprises a feature to permit the identification, by the developer, of widget availability based upon at least one of security or privilege settings.

15. A computer-implemented method, comprising:
forming a user interaction environment in an enterprise environment, the user interaction environment comprising:
  a first component configured to parse a desktop widget configuration file, the desktop widget configuration file configured to be run on a widget engine;
  a second component configured to emulate program code utilized when the desktop widget configuration file is run by the widget engine; and
  a third component configured to compose a page from the desktop widget configuration file utilizing the actions of the first and second components; and
installing a desktop widget engine emulator, for management by a developer, in the user interaction environment, the desktop widget engine emulator configured to receive the desktop widget configuration file and emulate the behavior of a widget engine to display a desktop widget in an enterprise environment to a user, the desktop widget emulator including a widget selector component configured to enable the developer to identify available widgets for use within the enterprise environment.

16. The method of claim 15, further comprising:
selecting desktop widgets for use with the desktop widget engine emulator.

17. The method of claim 15, further comprising:
selecting a manner of display for desktop widgets to be displayed by a user interface of the desktop widget engine emulator.

18. The method of claim 15, further comprising:
setting privileges for the desktop widget engine emulator, the privileges defining desktop widgets that the desktop widget engine emulator is allowed to display by a user interface of the desktop widget engine emulator.

19. The method of claim 15, further comprising:
setting security settings for the desktop widget engine emulator, the security settings defining desktop widgets that the desktop widget engine emulator is allowed to display by a user interface of the desktop widget engine emulator.

* * * * *

UNITED STATES PATENT AND TRADEMARK OFFICE
CERTIFICATE OF CORRECTION

PATENT NO. : 8,769,490 B2  
APPLICATION NO. : 12/211795  
DATED : July 1, 2014  
INVENTOR(S) : Poulsen et al.

It is certified that error appears in the above-identified patent and that said Letters Patent is hereby corrected as shown below:

In the Specification:

In column 4, line 4, delete "(FIG.3)" and insert -- (FIG.3). --, therefor.

In column 6, line 41, delete "may select" and insert -- selects --, therefor.

In column 6, line 54, delete "emulator" and insert -- emulator component --, therefor.

In column 6, line 58, delete "and or" and insert -- and/or --, therefor.

Signed and Sealed this
Third Day of March, 2015

Michelle K. Lee
*Deputy Director of the United States Patent and Trademark Office*